(12) United States Patent
Hiregoudar

(10) Patent No.: US 12,547,366 B2
(45) Date of Patent: Feb. 10, 2026

(54) SUPPORTING MULTIPLE AUDIO ENDPOINTS WITH A SINGLE INTEGRATED INTER-CHIP SOUND CONTROLLER

(71) Applicant: ADVANCED MICRO DEVICES, INC., Santa Clara, CA (US)

(72) Inventor: Basavaraj Hiregoudar, Hyderabad (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 498 days.

(21) Appl. No.: 17/977,131

(22) Filed: Oct. 31, 2022

(65) Prior Publication Data

US 2024/0143268 A1    May 2, 2024

(51) Int. Cl.
*G06F 3/16* (2006.01)
(52) U.S. Cl.
CPC .............. *G06F 3/162* (2013.01); *G06F 3/165* (2013.01)

(58) Field of Classification Search
None
See application file for complete search history.

(56) References Cited

U.S. PATENT DOCUMENTS

| | | | |
|---|---|---|---|
| 8,488,822 B2* | 7/2013 | Klemmensen | H04R 25/554 381/314 |
| 8,837,533 B2* | 9/2014 | Ibaraki | G11B 20/00818 370/535 |

* cited by examiner

*Primary Examiner* — Paul W Huber

(57) ABSTRACT

A computing system implementing a single Integrated Interchip Sound (I2S) controller supports simultaneous playback of audio data on different audio endpoints. The computing system maps a first set of audio data to a first set of transmission slots associated with a transmission channel of the single I2S controller. The computing system also maps a second set of audio data to a second set of transmission slots associated with the single I2S controller. The computing system transmits the first set of audio data during the first set of transmission slots to a first audio endpoint and transmits the second set of audio data during the second set of transmission slots to a second audio endpoint.

20 Claims, 12 Drawing Sheets

SUPPORTING MULTIPLE AUDIO ENDPOINTS WITH A SINGLE INTEGRATED INTER-CHIP SOUND CONTROLLER

BACKGROUND

Integrated Inter-chip Sound (I2S) is a digital audio serial bus interface transmission standard used for connecting digital audio devices together. For example, I2S is used to communicate digital audio data, such as pulse-code modulation (PCM) audio data, between internal devices of an electronic device. Examples of these internal devices include a coder/decoder (CODEC), a digital signal processor (DSP), a digital-to-analog converter (DAC), an analog-to-digital convertor (ADC), a digital input/output interface, a digital filter, and the like. An I2S component, such as an I2S controller, operates in a master mode in two directions, i.e., as a transmitter (Tx) and a receiver (Rx). The data for Tx and Rx are independent byte streams packed with the most significant byte first and the most significant bit in bit 7 of the first word. The number of bytes used for each sample (a sample for the left channel or right channel) is the minimum number of bytes to hold a sample.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Conventional I2S controller implementations typically utilize a separate I2S controller for each audio endpoint due to restrictions of the I2S architecture. The use of multiple I2S controllers supports simultaneous playback of different audio data on different audio endpoints. Implementing multiple I2S controllers increases the number of general-purpose input/output (GPIO) pins required for I2S controllers, which can lead to a shortage of GPIO pins. Also, in many instances, a voltage regulator/converter may be needed to support multiple I2S controllers, which increases the cost and complexity of the platform implementing the I2S controllers.

The present disclosure describes implementations of systems and methods for simultaneous playback of audio data on different endpoints utilizing a single I2S controller. As described in greater detail below, a single I2S controller is connected to multiple audio endpoints and configured in a time-division multiplexing (TDM) mode for supporting two or more audio endpoints. The audio data received by the I2S controller from an audio source is rearranged and managed through an intermediate buffer for supporting multiple streams, which are each associated with a different audio endpoint. For example, the input audio data from two streams/applications is arranged in the intermediate buffer based on the slots allotted to the different audio endpoints, such as a speaker and a headset, and also based on the activeness of the stream. Using TDM, the I2S controller outputs the audio data from intermediate buffer for simultaneous playback by the different audio endpoints. As such, the systems and methods described herein enable different audio streams to be simultaneously played by different audio endpoints using a single I2S controller. By implementing a single I2S controller, a voltage controller is not required to support multiple I2S controllers, which reduces cost and complexity of the platform. Also, the reduced number of number of I2S controllers needed to support multiple audio endpoints reduces the number of pin in the chip, thereby further reducing implementation costs and saving area in the chip.

Figure 1:
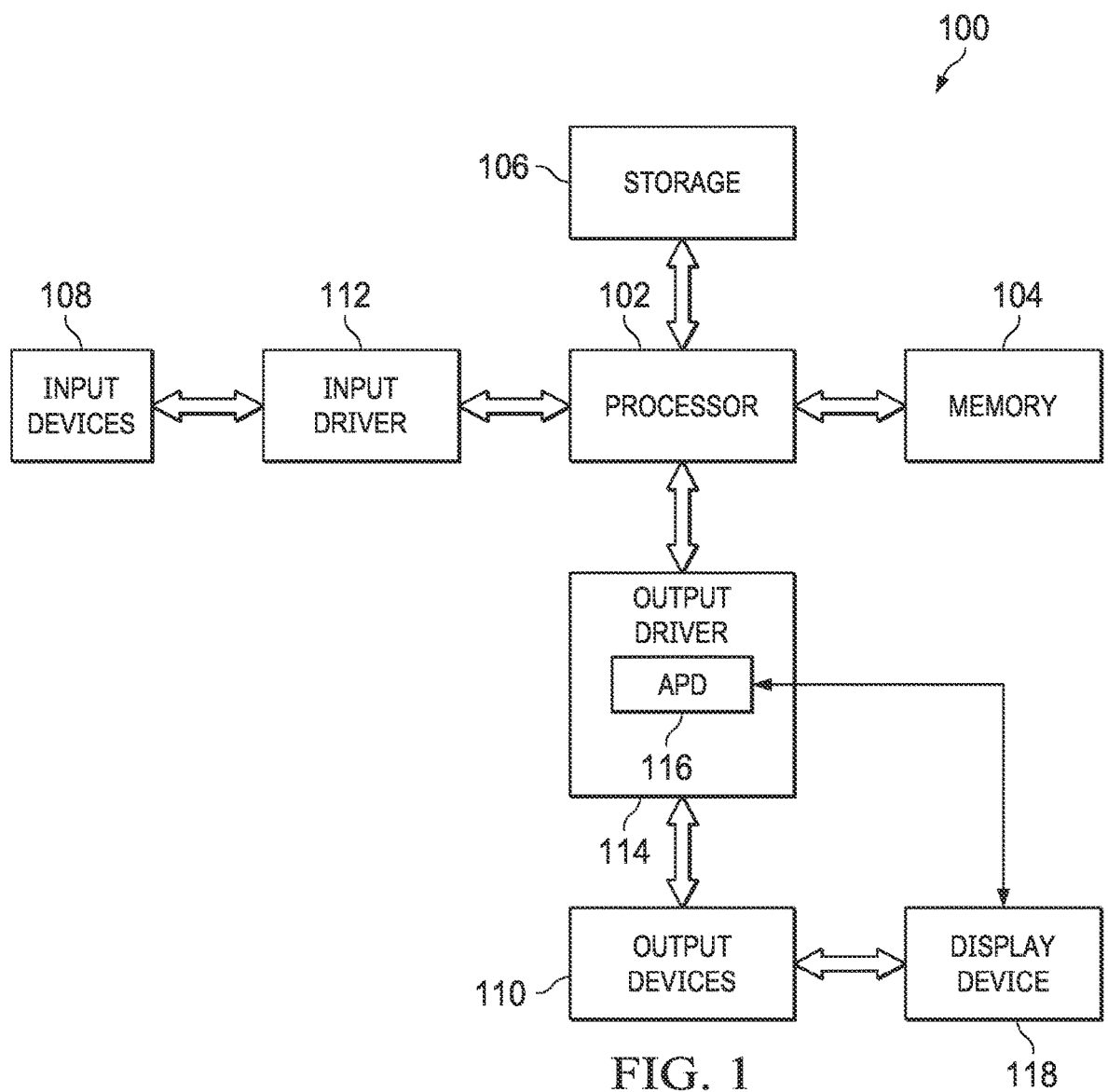
FIG. 1 is a block diagram of an example processing system in accordance with some implementations.

FIG. 1 a block diagram of an example computing system 100 in which the simultaneous audio playback techniques described herein can be implemented. In at least some implementations, the computing system 100 includes, for example, a computer, a mobile device, a gaming device, a tablet computing device, a wearable computing device, a set-top box, a television, or another type of computing system or device. The computing system 100, in at least some implementations, comprises a processor 102, memory 104, storage 106, one or more input devices 108, and one or more output devices 110. The computing system 100, in at least some implementations, also comprises one or more of an input driver 112 or an output driver 114. It should be understood that the computing system 100 can include additional components not shown in FIG. 1.

In at least some implementations, the processor 102 comprises a central processing unit (CPU), a graphics processing unit (GPU), a CPU and GPU located on the same die or multiple dies (e.g., using a multi-chip-module (MCM)), or one or more processor cores, wherein each processor core is a CPU or a GPU. The memory 104, in at least some implementations, is located on the same die as the processor 102 or is located separately from the processor 102. The memory 104 includes a volatile or non-volatile memory, such as random-access memory (RAM), dynamic RAM, cache, and so on.

The storage 106, in at least some implementations, comprises a fixed or removable storage, such as a hard disk drive, a solid-state drive, an optical disk, a flash drive, and so on. In at least some implementations, the input devices 108 comprise, for example, one or more of a keyboard, a keypad, a touch screen, a touchpad, a detector, a microphone, an accelerometer, a gyroscope, a biometric scanner, a network connection (e.g., a wireless local area network card for transmission/reception of wireless signals), and so on. The output devices 110, in at least some implementations, comprise, for example, one or more of a display, a speaker, a printer, a haptic feedback device, one or more lights, an antenna, or a network connection (e.g., a wireless local area network card for transmission/reception of wireless signals), and so on.

In at least some implementations, the input driver 112 communicates with the processor 102 and the input devices 108 and allows the processor 102 to receive input from the input devices 108. The output driver 114, in at least some implementations, communicates with the processor 102 and the output devices 110 and allows the processor 102 to send output to the output devices 110. It is noted that the computing system 100 operates in the same manner if the input driver 112 and the output driver 114 are not present. The output driver 114, in at least some implementations, includes an accelerated processing device (APD) 116 that is coupled to a display device 118. The APD accepts compute commands and graphics rendering commands from processor 102, processes those compute and graphics rendering commands, and provides pixel output to display device 118 for display. The APD 116, in at least some implementations, includes one or more parallel processing units that perform computations in accordance with a single-instruction-multiple-data (SIMD) paradigm. Thus, although various functionality is described herein as being performed by or in conjunction with the APD 116, in other implementations, the functionality described as being performed by the APD 116 is additionally or alternatively performed by other computing devices having similar capabilities that are not driven by a host processor (e.g., processor 102). For example, in at least some embodiments, any processing system that performs processing tasks in accordance with a SIMD paradigm performs the functionality described herein. Alternatively, in at least some embodiments, computing systems that do not perform processing tasks in accordance with a SIMD paradigm perform the functionality described herein.

Figure 2:
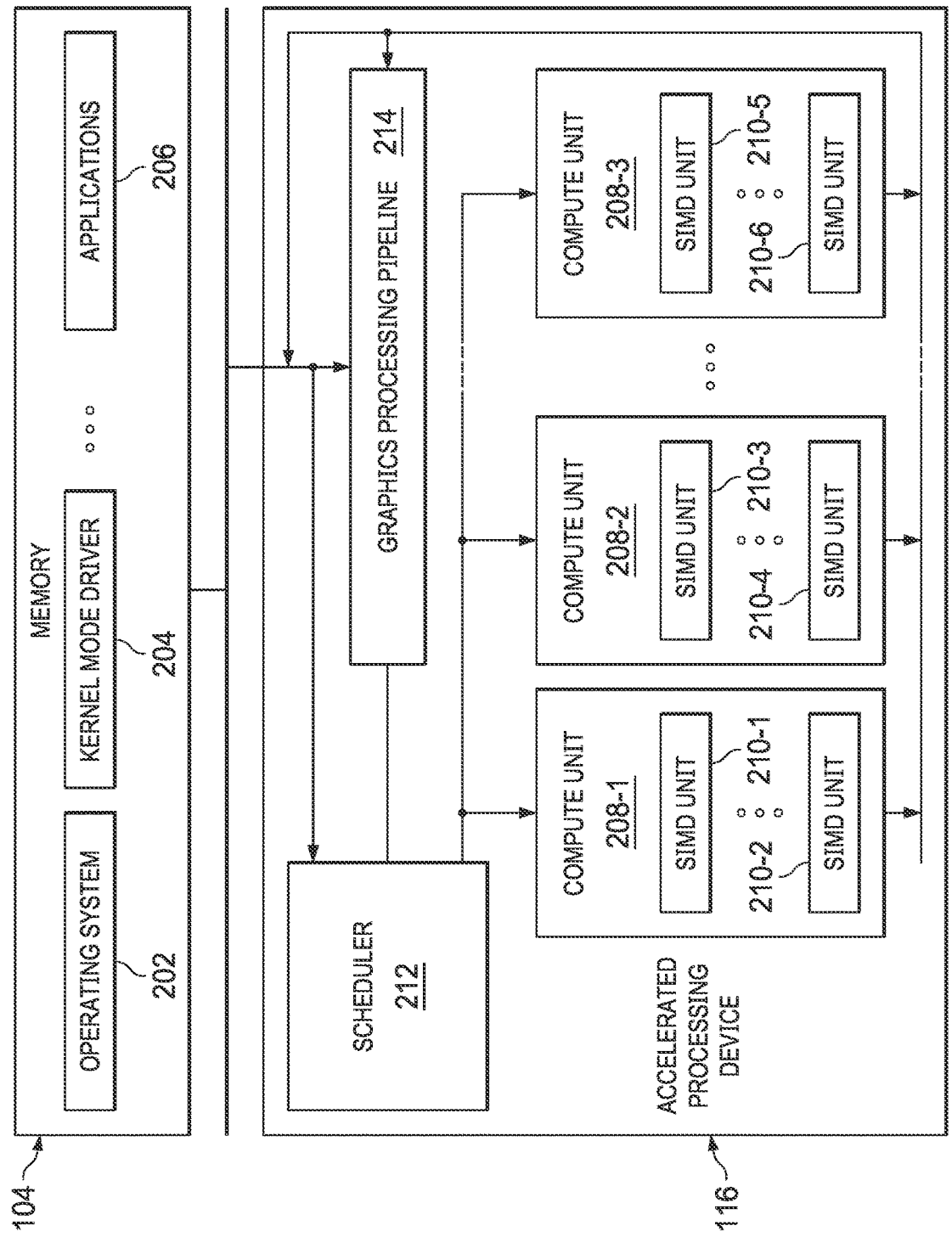
FIG. 2 is a block diagram illustrating additional detail of the processing device of FIG. 1 in accordance with some implementations.

FIG. 2 is a block diagram of the computing system 100 illustrating additional details related to the execution of processing tasks on the APD 116. In at least some embodiments, the processor 102 maintains, in memory 104, one or more control logic modules for execution by the processor 102. The control logic modules, in at least some embodiments, comprise an operating system 202, a kernel mode driver 204, and applications 206. These control logic modules control various features of the operation of the processor 102 and the APD 116. For example, the operating system 202 directly communicates with hardware and provides an interface to the hardware for other software executing on the processor 102. The kernel mode driver 204 controls operation of the APD 116 by, for example, providing an application programming interface (API) to software (e.g., applications 206) executing on the processor 102 to access various functionality of the APD 116. The kernel mode driver 204, in at least some embodiments, also includes a just-in-time compiler that compiles programs for execution by processing components (such as the SIMD units 210 discussed in further detail below) of the APD 116.

In at least some implementations, the APD 116 executes commands and programs for selected functions, such as graphics operations and non-graphics operations that may be suited for parallel processing. The APD 116, in at least some implementations, is used for executing graphics pipeline operations (e.g., pixel operations, geometric computations, etc.) and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116, in at least some implementations, comprises compute units 208 (illustrated as 208-1 to 208-3) that include one or more SIMD units 210 (illustrated as 210-1 to 210-6), which perform operations at the request of the processor 102 in a parallel manner according to a SIMD paradigm. The SIMD paradigm is one in which multiple processing elements share a single program control flow unit and program counter and execute the same program but with different data. In one example, each SIMD unit 210 comprises sixteen lanes, where each lane executes the same instruction at the same time as the other lanes in the SIMD unit 210 but can execute that instruction with different data. Lanes can be switched off with predication if not all lanes are to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

In at least some implementations, the basic unit of execution in compute units 208 is a work-item. Each work-item represents a single instantiation of a program that is to be executed in parallel in a particular lane. Work-items, in at least some implementations, are executed simultaneously as a "wavefront" on a single SIMD processing unit 210. One or more wavefronts are included in a "workgroup", which includes a collection of work-items designated to execute the same program. A workgroup is executed by executing each of the wavefronts that make up the workgroup. In other embodiments, the wavefronts are executed sequentially on a single SIMD unit 210 or partially or fully in parallel on different SIMD units 210. Wavefronts, in at least some implementations, represent the largest collection of work-items that can be executed simultaneously on a single SIMD unit 210. Thus, if commands received from the processor 102 indicate that a particular program is to be parallelized to such a degree that the program cannot execute on a single SIMD unit 210 simultaneously, then that program is broken up into wavefronts which are parallelized on two or more SIMD units 210 or serialized on the same SIMD unit 210 (or both parallelized and serialized). A scheduler 212 performs operations related to scheduling various wavefronts on different compute units 208 and SIMD units 210.

The parallelism afforded by the compute units 208, in at least some implementations, is suitable for graphics-related operations such as pixel value calculations, vertex transformations, and other graphics operations. Thus, in some instances, a graphics pipeline 214, which accepts graphics processing commands from the processor 102, provides computation tasks to the compute units 208 for execution in parallel.

In at least some embodiments, the compute units 208 are also used to perform computation tasks not related to graphics or not performed as part of the "normal" operation of a graphics pipeline 214 (e.g., custom operations performed to supplement processing performed for operation of the graphics pipeline 214). An application 206 or other software executing on the processor 102 transmits programs that define such computation tasks to the APD 116 for execution.

Figure 3:
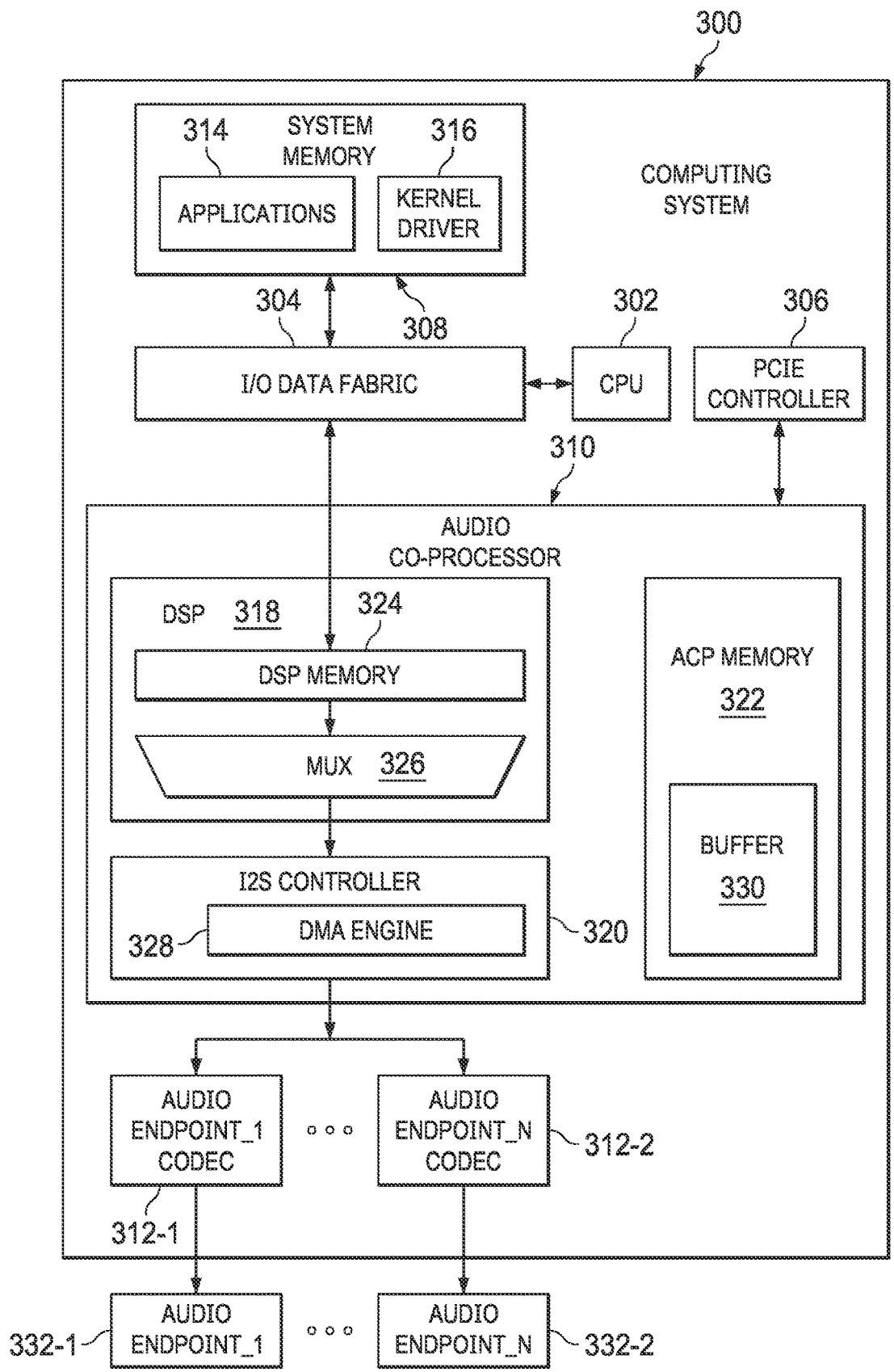
FIG. 3 is a block diagram of an example System-On-Chip device in accordance with some implementations.

FIG. 3 is a block diagram of another example of a computing system 300 in which the simultaneous audio playback techniques described herein can be implemented. In the example shown in FIG. 3, the computing system 300 is a system-on-chip (SoC) device capable of implementing one or more techniques described herein. The SoC device, in at least some implementations, is a component of the computing system 100 illustrated in FIG. 1 or is separate from the computing system 100. The computing system 300 is implemented as an SoC for the sake of example. However, in other implementations, any suitable computing device, such as the computing device of FIG. 1, a personal computer, server, smart phone, tablet computer, and so forth, are used. Such devices are implemented using either SoCs, discrete system components, or both in some implementations. It should be understood that FIG. 3 omits depiction of various components of the computing system 300 for clarity and ease of description.

In at least some implementations, the computing system 300 includes components such as a CPU 302, an input/output (I/O) data fabric 304, a peripheral component interconnect enhanced (PCIe) controller 306, system memory 308, an audio co-processor (ACP) 310, audio endpoint CODECs 312 (illustrated as audio endpoint CODEC 312-1 and audio endpoint CODEC 312-2), and the like. One or more of these and other components, in at least some implementations, are comprised of intellectual property (IP) blocks/cores, which are reusable units of logic, cells, or integrated circuit (IC) layouts.

The CPU 302, in at least some implementations, is similar to the processor 102 of FIG. 1 or is a CPU core complex that includes one or more suitable CPU cores. Each of the cores in a complex, in at least some implementations, includes a private cache and all of the cores in a complex are in communication with a shared cache. In at least some implementations, the computing system 300 includes a plurality of CPU core complexes. In at least some implementations, the CPU 302 is a parallel processor, such as any suitable parallel processor (e.g., graphics processing unit (GPU), machine learning (ML) application-specific integrated circuit (ASIC), etc.) or a combination of parallel processors. In other implementations, the computing system 300 includes one or more parallel processors (not shown) in addition to the CPU 302.

The data fabric 304, in at least one implementation, includes circuitry for providing communication interconnections among the various components of the computing system 300. Any suitable interconnection hardware is used in various implementations. In some implementations, from a physical standpoint, the data fabric 304 is implemented either in a central location of the computing system 300 or distributed to multiple hubs across the computing system 300 and interconnected using a suitable communications medium (e.g., a bus). From a logical standpoint, the data fabric 304 is located at the center of data flow, and information regarding the idleness of different components (including IP blocks) of the computing system 300 is concentrated (e.g., stored) in the data fabric 304.

The PCIe controller 306 is an example one type of I/O controller implemented by the computing system 300. The PCIe controller 306 includes circuitry for managing a PCIe interface between I/O devices and the I/O data fabric 304. Examples of other I/O controllers include a universal serial bus (USB), a non-volatile memory host controller interface (NVMe) bus, a serial advanced technology attachment (SATA) bus, a gigabit Ethernet (xGBE), a secure digital (SD) interface, a general-purpose input/output (GPIO) connection, a sensor fusion I/O connection, and or any other suitable I/O hardware.

A memory controller (not shown) manages access to system memory 308. For example, requests from the CPU 302 or other devices for reading from or for writing to system memory 308 are managed by the memory controller. In some embodiments, one or more applications 314 within the system memory 308 include various programs or commands to perform computations that are also executed at the CPU 302. The system memory 308, in at least some implementations, also includes an operating system (not shown) and kernel mode driver 316 similar to those components described above with respect to FIG. 2. In at least some implementations, the system memory 308 includes non-persistent memory, such as dynamic random-access memory (not shown). In various embodiments, the system memory 308 stores processing logic instructions, constant values, variable values during execution of portions of applications or other processing logic, or other desired information. For example, in various embodiments, parts of control logic to perform one or more operations on CPU 302 reside within system memory 308 during execution of the respective portions of the operation by CPU 302. During execution, respective applications, operating system functions, processing logic commands, and system software reside in system memory 308. Control logic commands that are fundamental to operating system generally reside in system memory 308 during execution. In some embodiments, other software commands (e.g., a set of instructions or commands used to implement a device driver) also reside in system memory 308 during execution of the computing system 300.

The audio co-processor 310, in at least some implementations, is a dedicated co-processor device configured to perform calculations on audio data. In at least some implementations, the audio co-processor 310 includes a digital signal processor (DSP) 318, an I2S controller 320, and memory 322 (e.g., dynamic random-access memory (DRAM) or any other suitable type or memory). It should be understood that additional components of the audio co-processor 310 have been omitted for clarity and ease of description. Also, in at least some implementations, the ACP memory 322 is part of or replaced by one or more of the system memory 308, or the DSP memory 324. The ACP memory 322, in at least some implementations, includes one or more buffers 330 for the I2S controller 320.

The DSP 318, in at least some embodiments, includes memory 324, such as static random-access memory (SRAM), and a multiplexer (MUX) 326. In other implementations, the MUX 326 is implemented as a software audio component/plugin executed from DSP 318. The DSP 318 is configured to carry out digital signal processing algorithms (e.g., for audio processing). Examples of such algorithms include finite impulse response (FIR) filtering algorithms, and so forth. Typically, a DSP performs such algorithms more efficiently (e.g., faster, and/or using less power) than a CPU or other processor in a computing system. Accordingly, in some implementations, a host OS, such as the OS 202 or the OS (not shown) implemented on the computing system 300, transfers data to the DSP 318 to perform such calculations, and retrieves or receives the results after the DSP 318 has completed the calculations. The DSP 318 includes firmware running on the audio co-processor 310 and one or more ring buffers (i.e., circular buffers), which are implemented in the DSP memory 324 in this example or are implemented in other hardware in other implementations. The DSP memory 324 is a working memory for DSP 318.

Figure 4:
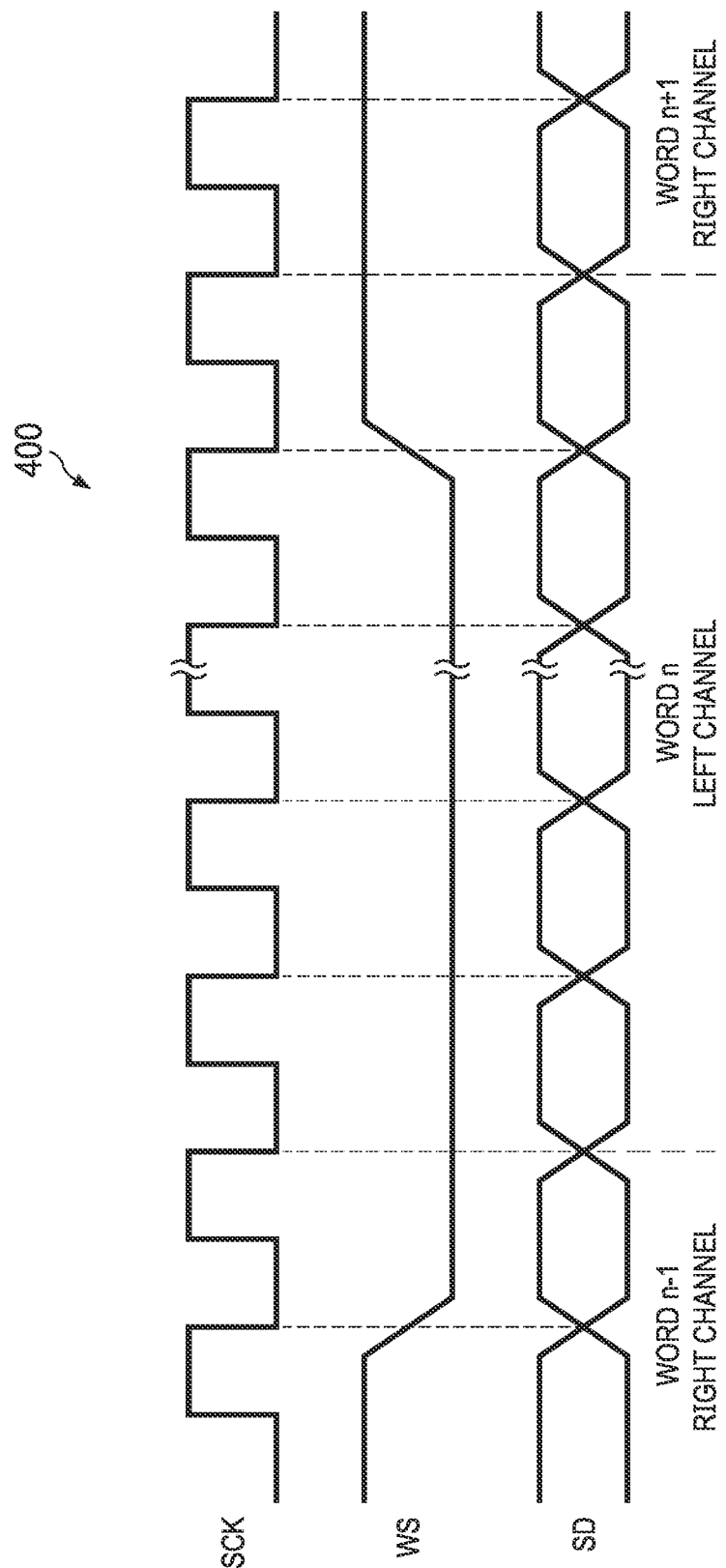
FIG. 4 illustrates example of general Integrated Inter-chip Sound (I2S) interface timing in accordance with some implementations.

The I2S controller 320, in at least some implementations, includes a direct memory access (DMA) controller/engine 328. It should be understood that additional components of the I2S controller 320 have been omitted for clarity and ease of description. In at least some implementations, the I2S controller 320 has three main signals/lines including a continuous serial clock (SCLK, SCK, or BCLK) signal, a word select (WS or LRCLK) signal, and a serial data line (SD) signal. FIG. 4 shows one example of the I2S interface timing 400 provided by the I2S controller 320 based on the SCK, WS, and SD signals. The word select line is the channel selection signal indicated the channel selected by the I2S controller. For example, if WS=0, channel 1 (left channel) has been selected. However, if WS=1, channel 2 (right channel) has been selected. WS can change either on a trailing or leading edge of the serial clock, but does not need to be symmetrical. The clock line (SCK) is the synchronization signal. The data line (SD) transmits the serial data (i.e., PCM audio data). Typically, the serial data is transmitted in two's complement with the most significant bit (MSB) first. The serial data transmitted by the by the I2S controller can be synchronized with either the falling or rising edge of the clock signal.

As described in greater detail below, the single I2S controller 320 is configured to output audio data to multiple audio endpoints 332 (illustrated as audio endpoint 332-1 and audio endpoint 332-2) separately or simultaneously via a CODEC 312 (e.g., a DAC) of each audio endpoint 332. For example, the MUX 326 interleaves audio data associated with the different audio endpoints 332 and stores this interleaved audio data in an intermediate buffer 330 associated with the I2S controller 320. The buffer 330, in at least some implementations, is implemented as part of the system memory 308, ACP memory 322, the DSP memory 324, or a combination thereof. The DMA controller 328 of the I2S controller then sends a first set of audio data stored in the buffer 330 to a first audio endpoint 332-1 and a second set of audio data stored in the buffer 330 to a second audio endpoint 332-2 for simultaneous (or concurrent) playback. It should be understood that the single I2S controller 320 is able to send separate audio data to more than two audio endpoints 332.

Figure 5:
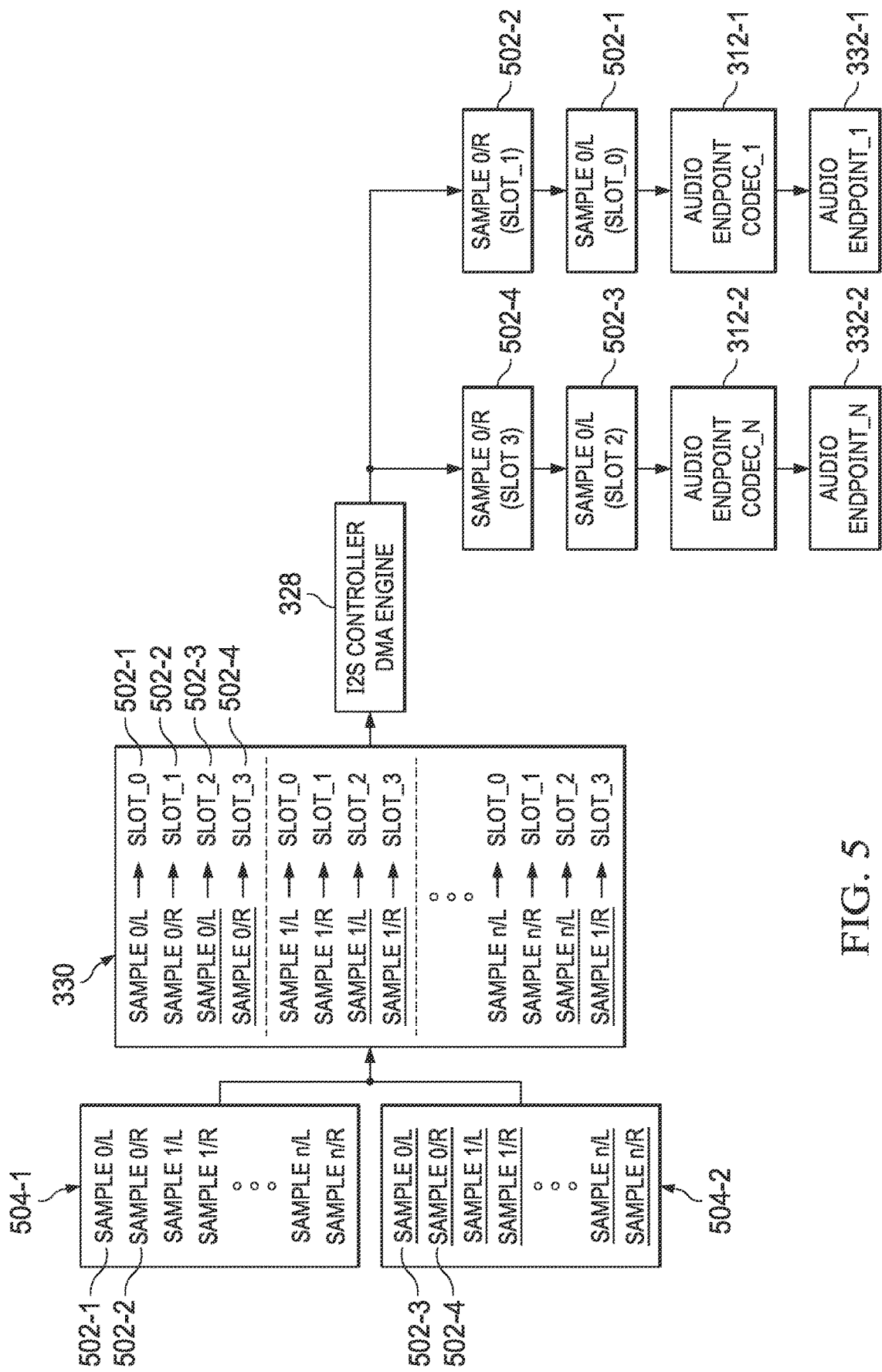
FIG. 5 is a dataflow diagram illustrating one example a single I2S controller supporting audio playback on multiple audio endpoints in accordance with some implementations.

FIG. 5 illustrates one example of a single I2S controller 320 supporting audio playback on multiple audio endpoints 332. In this example, the I2S controller 320 and each of the audio endpoint CODECs 312 are configured to operate in a TDM mode in which the I2S controller transmits audio data for multiple audio streams on a single channel. For example, the audio data 502 is broken up into frames and assigned to time slots. The word clock signal of the I2S controller 320 becomes a frame sync strobe and the word clock signal goes high for one bit clock period at the start of each frame. The audio endpoint CODECs 312, in at least some implementations, float the data line (or lines) until their assigned slot/channel number (or numbers) to start clocking out data. In at least some implementations, the audio endpoints CODECs 312 are assigned specific transmission slots (e.g., Slot_0, Slot_1, Slot_2, Slot_3 . . . Slot_N) as part of their TDM mode configuration. For example, a machine driver of the computing system 300 informs a CODEC driver that the corresponding audio endpoint CODEC 312 is to use a specific pair of transmission slots. In the example shown in FIG. 5, the computing system 300 has assigned Slot_0 (audio left channel) and Slot_1 (audio right channel) of the I2S controller transmission to audio endpoint_1 CODEC 312 and has assigned Slot_2 (audio left channel) and Slot_3 (audio right channel) of the I2S controller transmission to audio endpoint_N CODEC 312.

In at least some implementations, (digital) audio data 502 generated by at least one application 314 is stored in one or more buffers 504 (illustrated as buffer 504-1 and buffer 504-2) of the system memory 308. For example, FIG. 5 shows that audio data 502 associated with a first audio stream generated by a first application 314 is stored in a first buffer 504-2 and audio data 502 associated with a second audio stream generated by a second application 314 is stored in a second buffer 504-2. The first application 314 and the second application 314 are either the same application or different applications. The audio data 502 in FIG. 5 for each audio stream is two-channel audio data and is illustrated as audio data samples 502-1 to 502-4. However, the techniques described herein are not limited to two-channel audio. Also, the audio data 502 associated with the first stream generated by the first application 314 is represented in FIG. 5 by the non-underlined text (e.g., "Sample . . . ") and the audio data associated with the second stream generated by the second application 314 is represented in FIG. 5 by the underlined text (e.g., "Sample . . . ") in the buffers 504.

In at least some implementations, the kernel driver 316, such as an audio co-processor kernel driver, of the computing system 300 reads the audio data 502 from the buffers 504 in the system memory 308 and write the audio data 502 to an intermediate buffer 330, such as an I2S ring buffer, in the ACP memory 322. However, because the I2S controller 320 has a single output signal/channel, if the audio data 502 was transmitted to the audio endpoints 332 in its previous arrangement in the system memory buffers 504, simultaneous playback of the audio data 502 associated with the different audio streams over the different audio endpoints 332 would not be possible. Therefore, in at least some implementations, the kernel driver 316 rearranges the audio data 502 when storing the audio data 502 in the intermediate buffer 330. The kernel driver 316, in at least some implementations, interleaves the audio data 502 associated with the first audio stream and the audio data 502 associated with the second audio stream. The interleaved audio data 502 is then stored in the intermediate buffer 330. The interleaving process results in the audio data 502 being mapped to corresponding audio endpoints 332 in an interleaved manner. For example, the interleaving operation performed by the kernel driver 316, in at least some embodiments, arranges the audio data 502 of the first and second audio streams such that the first audio sample (e.g., Sample_0/L) for the left channel of the first audio stream is mapped to Slot_0 of the I2S controller transmission timing, the first audio sample (e.g., Sample_0/R) for the right channel of the first audio stream is mapped to Slot_1 of the I2S controller transmission timing, the first audio sample (e.g., Sample_0/L) for the left channel of the second audio stream is mapped to Slot_2 of the I2S controller transmission timing, and the first audio sample (e.g., Sample_0/R) for the right channel of the second audio stream is mapped to Slot_3 of the I2S controller transmission timing. The second audio sample (e.g., Sample_1/L) for the left channel of the first audio stream is mapped to Slot_0 of the I2S controller transmission timing, the second audio sample (e.g., Sample_1/R) for the right channel of the first stream is mapped to Slot_1 of the I2S controller transmission timing, the second audio sample (e.g., Sample_1/L) for the left channel of the second audio stream is mapped to Slot_2 of the I2S controller transmission timing, and the second audio sample (e.g., Sample_1/R) for the right channel of the second stream is mapped to Slot_3 of the I2S controller transmission timing. This mapping process is repeated for the remaining audio data 502 of the first and second streams.

It should be understood that sequential transmission slots are not required to be assigned to the audio endpoints CODECs 312 and non-sequential transmission slots can be assigned. For example, in at least some implementations, audio endpoint_1 CODEC 312-1 is assigned Slot_0 and Slot_3 and audio endpoint_N CODEC 312-2 is assigned Slot_1 and Slot_2. In these instances, the corresponding interleaved audio data 502 is mapped to the corresponding transmission slot similar to that described above. For example, the audio data 502 is interleaved and stored in the intermediate buffer 330 such that Sample_0/L for the first audio stream is mapped to Slot_0, Sample_0/L for the second audio stream is mapped to Slot_1, Sample_0/R for the second audio stream is mapped to Slot_2, and sample 0/R for the second audio stream is mapped to Slot_3.

The I2S controller 320, in at least some implementations, uses a DMA controller 328 to read the interleaved audio data 502 from the buffer 330 for transmission to the audio endpoint CODEC 312 associated with the audio data 502. For example, the DMA controller 328 reads the interleaved audio data 502 from the buffer 330 and stores the interleaved audio data 502 in another buffer (not shown), such as a first-in-first-out (FIFO) buffer of the I2S controller 320. In the example shown in FIG. 5, the DMA controller 328 first reads Sample_0/L for the left audio channel and Sample_0/R for the right audio channel of the first audio stream from the buffer 330 and then reads Sample_0/L for the left audio channel and Sample_0/R for the right audio channel of the second audio stream from the buffer 330. The DMA controller 328 stores this data in the FIFO buffer (or another type of buffer) and continues this process until the FIFO buffer if full. The I2S controller 320 then transmits Sample_0/L for the first audio stream in Slot_0 of the transmission, Sample_0/R for the first audio stream in Slot_1 of the transmission, Sample_0/L for the second audio stream in Slot_2 of the transmission, Sample_0/R for the second audio stream in Slot_2 of the transmission, and so on. As described above, each of the audio endpoint CODECs 312 are configured to clock out data at their assigned slot numbers. Therefore, in the example shown in FIG. 5, audio endpoint_1 CODEC 312-1 obtains Sample_0/L for the first audio stream in Slot_0 of the transmission and Sample_0/R for the first audio stream in Slot_1 of the transmission. Audio endpoint_N CODEC 312-2 obtains Sample_0/L for the second audio stream in Slot_2 of the transmission and Sample_0/R for the second audio stream in Slot_3 of the transmission. This process repeats for the remaining audio data 502. When the audio endpoint CODECs 312 obtain their audio data 502, they process the audio data 502 and then output the processed audio data 502 to their respective audio endpoint 332. As such, audio endpoint_1 332-1 and audio endpoint_N 332-2 are able to simultaneously play audio data 502 from different audio streams even though they are being supported by only a single I2S controller 320.

Figure 6:
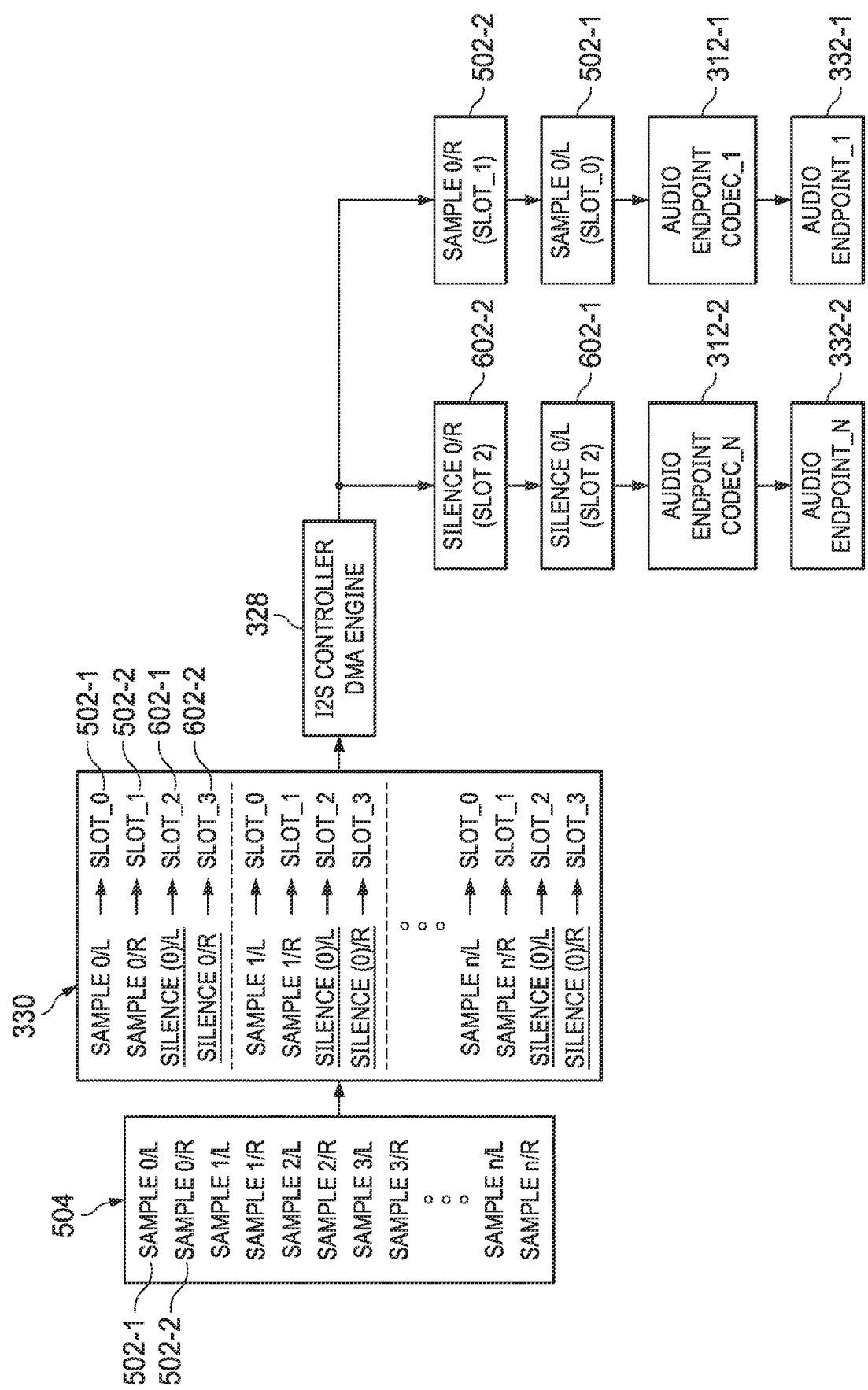
FIG. 6 is a dataflow diagram illustrating one example a single I2S controller supporting audio playback on multiple audio endpoints when one of the audio endpoints is to remain silent during audio playback by another audio endpoint in accordance with some implementations.

In some instances, even though the I2S controller 320 is supporting multiple audio endpoints 332, only one of the multiple audio endpoints 332 may be associated with an audio stream. For example, if the I2S controller 320 supports both a headset and a speaker, the speaker can be associated with an audio stream while the headset is not associated with an audio stream. In this situation, if the I2S controller 320 outputs audio data 502 associated with the audio single audio stream based on the implementation described above with respect to FIG. 5, both the audio endpoints 332 will play the audio data 502 instead of just the intended audio endpoint 332. Therefore, in at least some implementations, if only a single audio stream is to be played back by only one of the audio endpoints 332, the kernel driver 316 inserts audio data 602 representing silence on the transmission slots associated with the audio endpoint 332 that is to remain silent during playback of the audio data 502, as shown in FIG. 6. For example, FIG. 6 shows that audio data 502 associated with a two-channel single audio stream is stored in a buffer 504 of the system memory 308. Similar to FIG. 5, the kernel driver 316, in at least some implementations, reads the audio data 502 from the buffer 504 in the system memory 308 and writes the audio data 502 to the intermediate buffer 330 in the ACP memory 322.

In at least some implementations, the kernel driver 316 rearranges the audio data 502 being read from the system memory buffer 504 with audio data 602 (illustrated as audio data 602-1 and audio data 602-2) representing silence (e.g., all zero values). For example, similar to FIG. 5, the kernel driver 316 interleaves the audio data 502 associated with the audio stream and the audio data 602 representing silence. The interleaved audio data 502 is stored in, for example, the intermediate buffer 330. The interleaving process results in the audio data 502 being mapped to the audio endpoint_1 332-1 that is to playback the audio data 502 and the audio data 602 representing silence being mapped to audio endpoint_N 332-2 that is to remain silent during playback of the audio data 502 by audio endpoint 1. For example, the interleaving operation performed by the kernel driver 316, in at least some embodiments, arranges the audio data 502 of the audio stream and the audio data 602 representing silence such that the first audio sample (e.g., Sample_0) for the left audio channel of the audio stream is mapped to Slot_0 of the I2S controller transmission timing, the first audio sample (e.g., Sample_0) for the right audio channel of the audio stream is mapped to Slot_1 of the I2S controller transmission timing, left audio channel silence (e.g., Silence (0)/L) is mapped to Slot_2 of the I2S controller transmission timing, and right audio channel silence (e.g., Silence (0)/R) is mapped to Slot_3 of the I2S controller transmission timing. This mapping process is repeated for the remaining audio data 502 of the audio stream. It should be understood that non-sequential slots can have audio data 502 associated with the audio stream and audio data represent 602 silence similar to that described above with respect to FIG. 5.

Similar to FIG. 5, the I2S controller 320, in at least some implementations, uses the DMA controller 328 to read the interleaved audio data 502 and silence audio data 602 from the buffer 330 for transmission to audio endpoint_1 CODEC 312-1 and audio endpoint_N CODEC 312-2, respectively. When the audio endpoint_1 CODEC 312-1 receives the audio data 502, it processes the audio data 502 and then outputs the processed audio data 502 to audio endpoint_1 332-1 for playback. When the audio endpoint_N CODEC 312-1 receives the silent audio data 602, audio with sound is not output to the audio endpoint_N 332-2. As such, audio endpoint_N 332-2 remains silent during playback of the audio data 502 by audio endpoint_1 332-21. It should be understood the aspects described above with respect to FIG. 6 also apply to instances where two or more audio endpoints 332 are to remain silent during playback of audio data 502 by one or more audio endpoints 332. Also, in some instances, multiple endpoints 332 may be configured with the same transmission slots (e.g., Slot_0 and Slot_1). In this instance, the audio endpoint 332 that is to remain silent can be disabled by the kernel driver 316 (or DSP 318) and the audio data 602 represent silence is not interleaved with audio data 502 associated with the audio stream.

Figure 7:
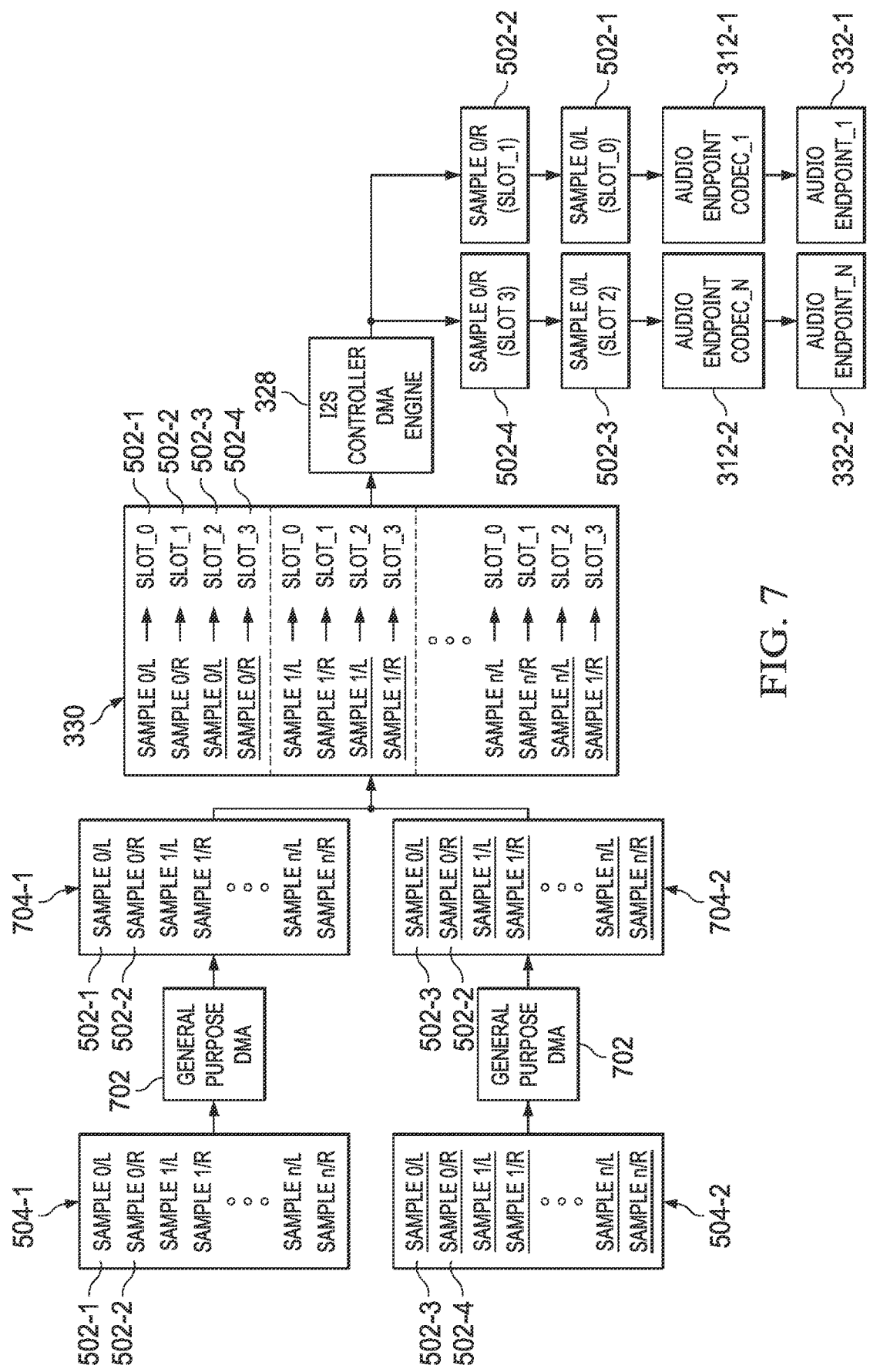
FIG. 7 is a dataflow diagram illustrating another example a single I2S controller supporting audio playback on multiple audio endpoints in accordance with some implementations.

In at least some implementations, the DSP 318 performs one or more of the operations described above with respect to FIG. 5 and FIG. 6 instead of the kernel driver 316. As shown in FIG. 7, the DSP 318 uses a general-purpose DMA controller 702 to read the audio data 502 from the buffers 504 in the system memory 308 and write the audio data 502 to a local buffer 704 (illustrated as buffer 704-1 and buffer 704-2), such as a ring buffer, in the DSP memory 324. In at least some implementations, the audio data 502 for the different audio streams has the same arrangement in the DSP buffers 704 as when the audio data 502 was stored in the system memory buffer(s) 504. Therefore, to enable the I2S 320 to support simultaneous playback of the audio data 502 at different audio endpoints 332, the DSP 318 rearranges the audio data 502 stored in the DSP memory 324, similar to that described above with respect to FIG. 5. The DSP 318 uses the MUX 326 to interleave the audio data 502 associated with the first audio stream and the audio data 502 associated with the second audio stream. The interleaved audio data 502 is stored in, for example, the intermediate buffer 330. The I2S controller 320 then transmits the interleaved audio data 502 associated with the different audio streams for simultaneous (or concurrent) playback by to the audio endpoints 332, as described above with respect to FIG. 5.

Figure 8:
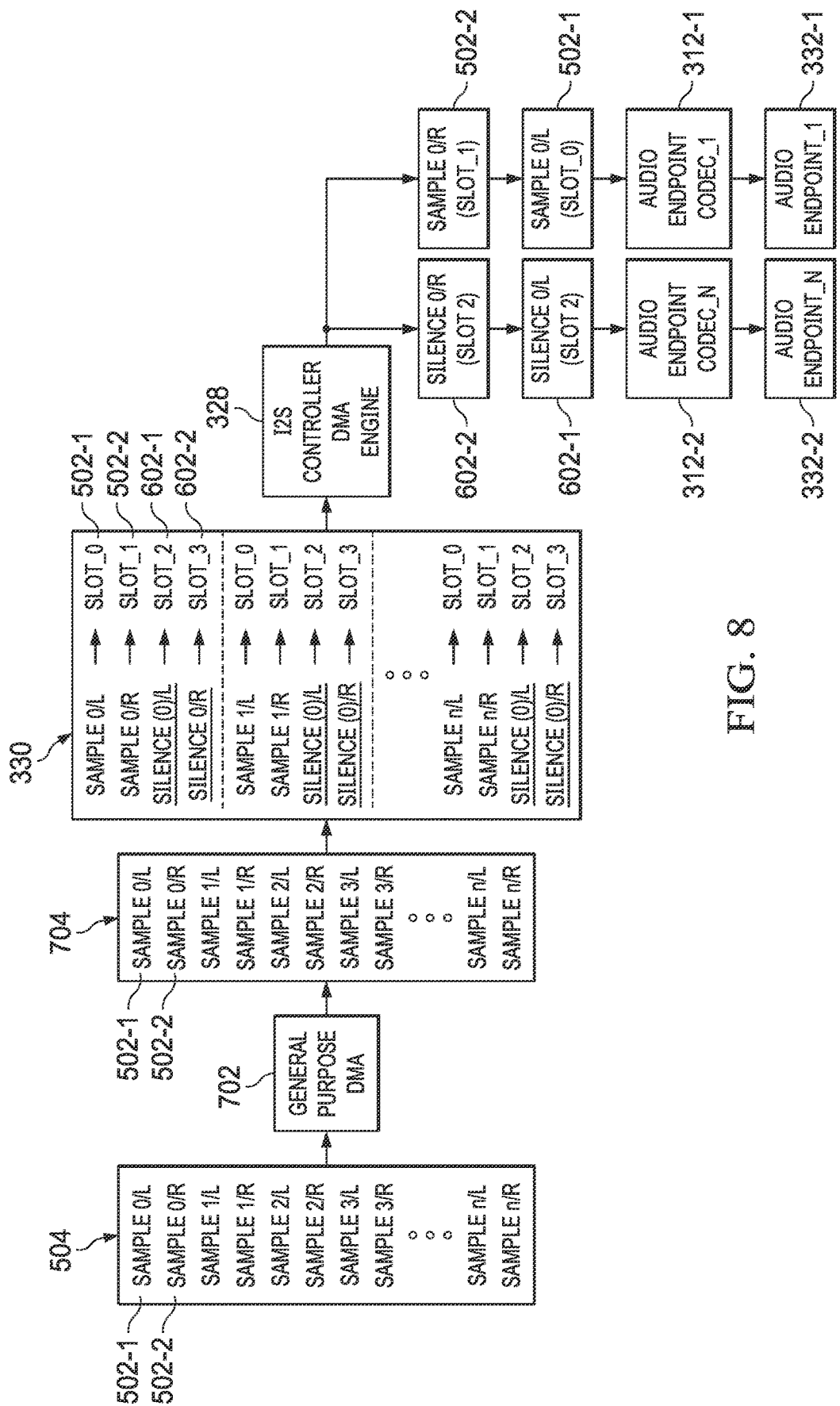
FIG. 8 is a dataflow diagram illustrating another example a single I2S controller supporting audio playback on multiple audio endpoints when one of the audio endpoints is to remain silent during audio playback by another audio endpoint in accordance with some implementations.

As described above with respect to FIG. 6, in some instances, at least one of the audio endpoints 332 is to remain silent while at least one other audio endpoint 332 plays back audio data 502. In these instances, the DSP 318 inserts audio data 602 representing silence on the transmission slots associated with the audio endpoint 332 that is to remain silent during playback of the audio data 502, similar to the operations described above with respect to FIG. 6. However, the DSP 318 uses the MUX 326 to interleave the audio data 502 associated with the audio stream with the audio data 602 representing silence. For example, FIG. 8 shows that after the DSP 318 has transferred the audio data 502 from the system memory buffer 504 to its local buffer 704, the DSP 318 uses the MUX 326 to interleave the audio data 502 with audio data 602 representing silence (e.g., all zero values). The interleaved audio data 502 is stored in, for example, the intermediate buffer 330 of the ACP memory 322. The I2S controller 320 then transmits the interleaved audio data 502 comprising the audio data 502 associated with the audio stream and the audio data 602 representing silent, as described above with respect to FIG. 5 and FIG. 6.

In at least some implementations, the computing system 300 implements a DSP firmware framework, such as Sound Open Firmware (SOF), in which the digital audio interfaces (DAIs), e.g., audio endpoint CODECs 312, are to be bound to a given digital audio source and a separate I2S controller. As such, to support multiple audio endpoints 332 using a single I2S controller 320 when this type of framework is being implemented, a virtual/logical instance of the I2S controller 320 is assigned to the audio endpoint CODEC 312 of one or more of the endpoints 332. In at least some implementations, the virtual/logical instance of the I2S controller 320, is created with the context such that audio kernel driver identifies the virtual/logical instance and passes on configuration parameters. Therefore, the framework identifies a separate I2S controller 320 being associated to each of the first audio endpoint CODEC 312-1 and second audio endpoint CODEC 312-2 and the operations discussed above with respect to FIGS. 5-8 can be performed.

Figure 9:
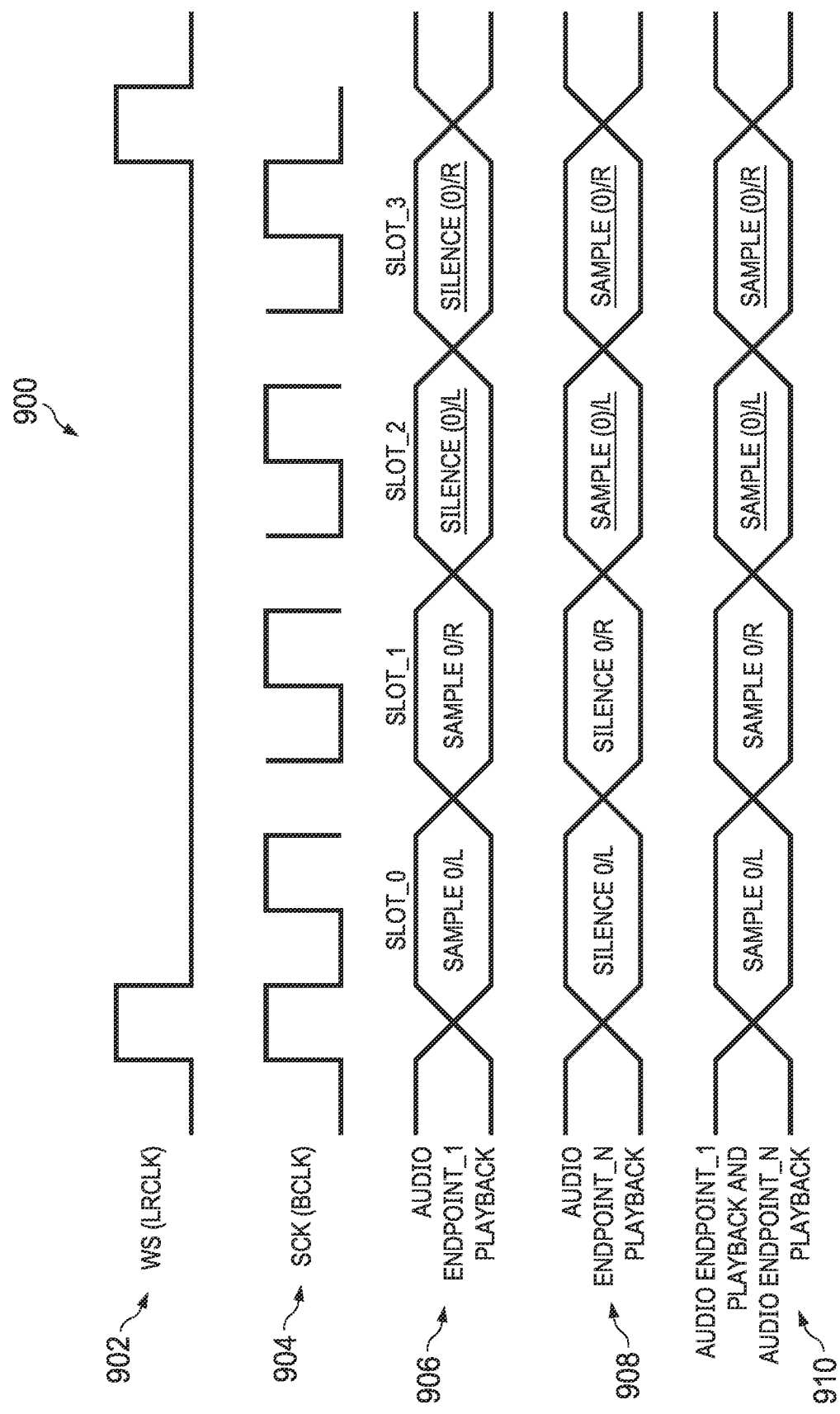
FIG. 9 illustrates example Integrated Inter-chip Sound (I2S) interface timing based on FIG. 5 to FIG. 8 in accordance with some implementations.

FIG. 9 shows one example of the I2S interface timing 900 provided by the I2S controller 320 according to the implementations described above with respect to FIG. 5 to FIG. 8. In the example shown in FIG. 9, the interface timing 900 includes a timing 902 for a word select (WS or LRCLK) signal and timing 904 for a continuous serial clock (SCK or BCLK). The interface timing 900 of FIG. 9 also shows timing 906 for the data line when audio endpoint_1 332-1 is the only endpoint outputting audio data 502, timing 908 for the data line when audio endpoint_N 332-2 is the only endpoint outputting audio data 502, and timing 910 for the data line when both audio endpoint_1 332-1 and endpoint_N 332-2 are outputting audio data 502.

Figure 10:
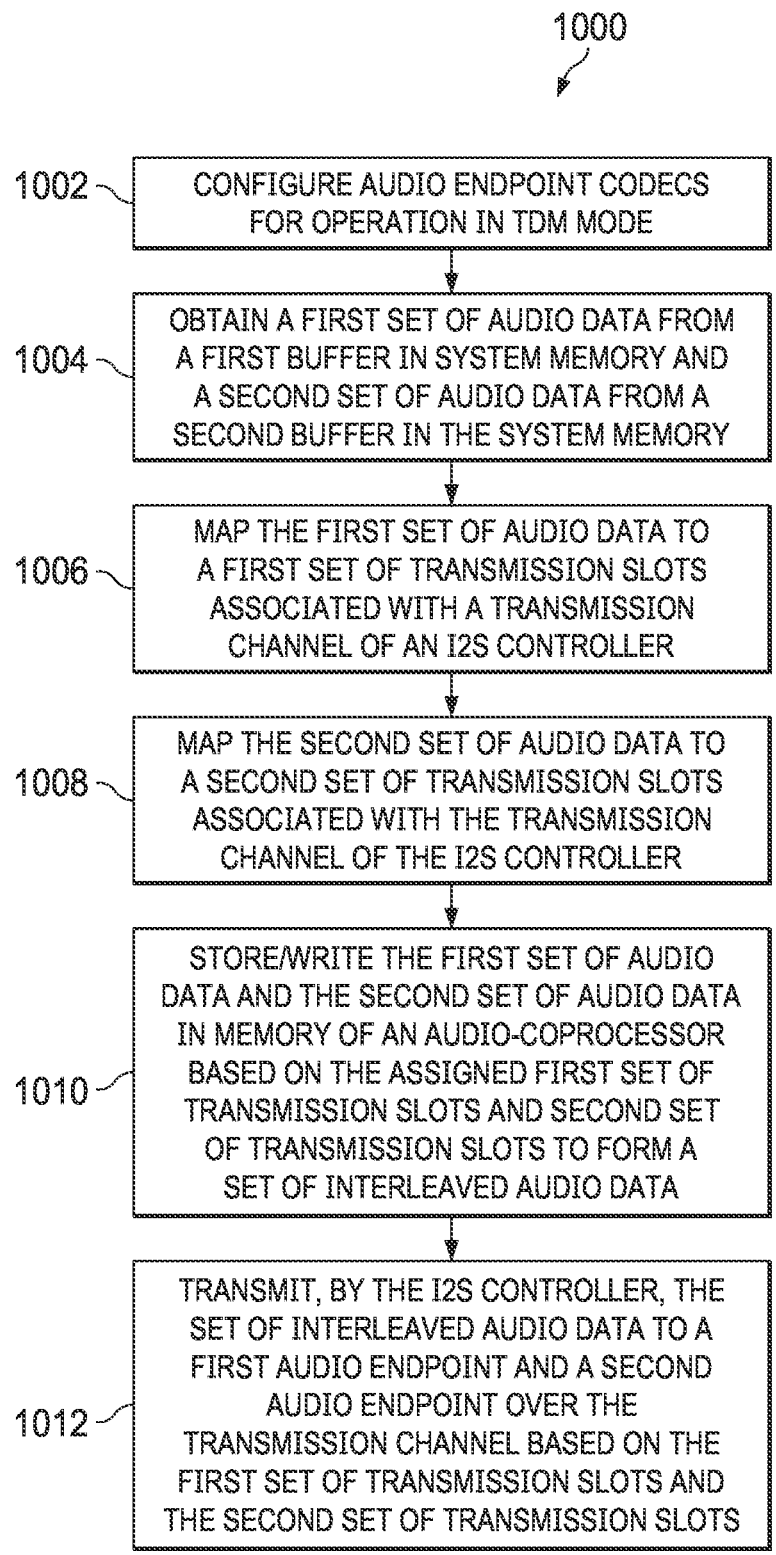
FIG. 10 is a flow diagram illustrating an overview of one example method for supporting simultaneous playback of audio data at different audio endpoints using a single controller in accordance with some implementations.

FIG. 10 is a flow diagram illustrating an overview of one example method 1000 for supporting simultaneous playback of audio data 502 at different audio endpoints 332 using a single I2S controller 320. It should be understood the processes described below with respect to method 1000 have been described above in greater detail with reference to FIG. 5 to FIG. 8. Also, one or more blocks may be omitted from or added to the method 1000 shown in FIG. 10. At block 1002, the computing system 300 configures the audio endpoint CODECs 312 supported by the single I2S controller 320 to operation in TDM mode. For example, the endpoint CODECs 312 are assigned transmission slots associated with a single transmission channel of the I2S controller 320. At block 1004, the computing system 300 obtains a first set of audio data 502-1 from a first buffer 504-1 in the system memory 308 and obtains a second set of audio data 502-2 from a second buffer 504-2 in the system memory 308.

At block 1006, The computing system 300 maps the first set of audio data 502-1 to a first set of transmission slots associated with the transmission channel of the I2S controller 320. At block 1008, The computing system 300 maps the second set of audio data 502-2 to a second set of transmission slots associated with the transmission channel of the I2S controller 320. At block 1010, the computing system 300 stores/writes the first set of audio data 502-1 and the second set of audio data 502-2 in a buffer/memory 330 of an audio co-processor 310 based on the assigned first set of transmission slots and the second set of transmission slots to form a set of interleaved audio data 502. At block 1012, the I2S controller 320 of the computing system 300 transmits the set of interleaved audio data 502 to the first audio endpoint_1 332-1 and the second audio endpoint_N 332-2 over the transmission channel based on the first and second sets of transmission slots.

Figure 11:
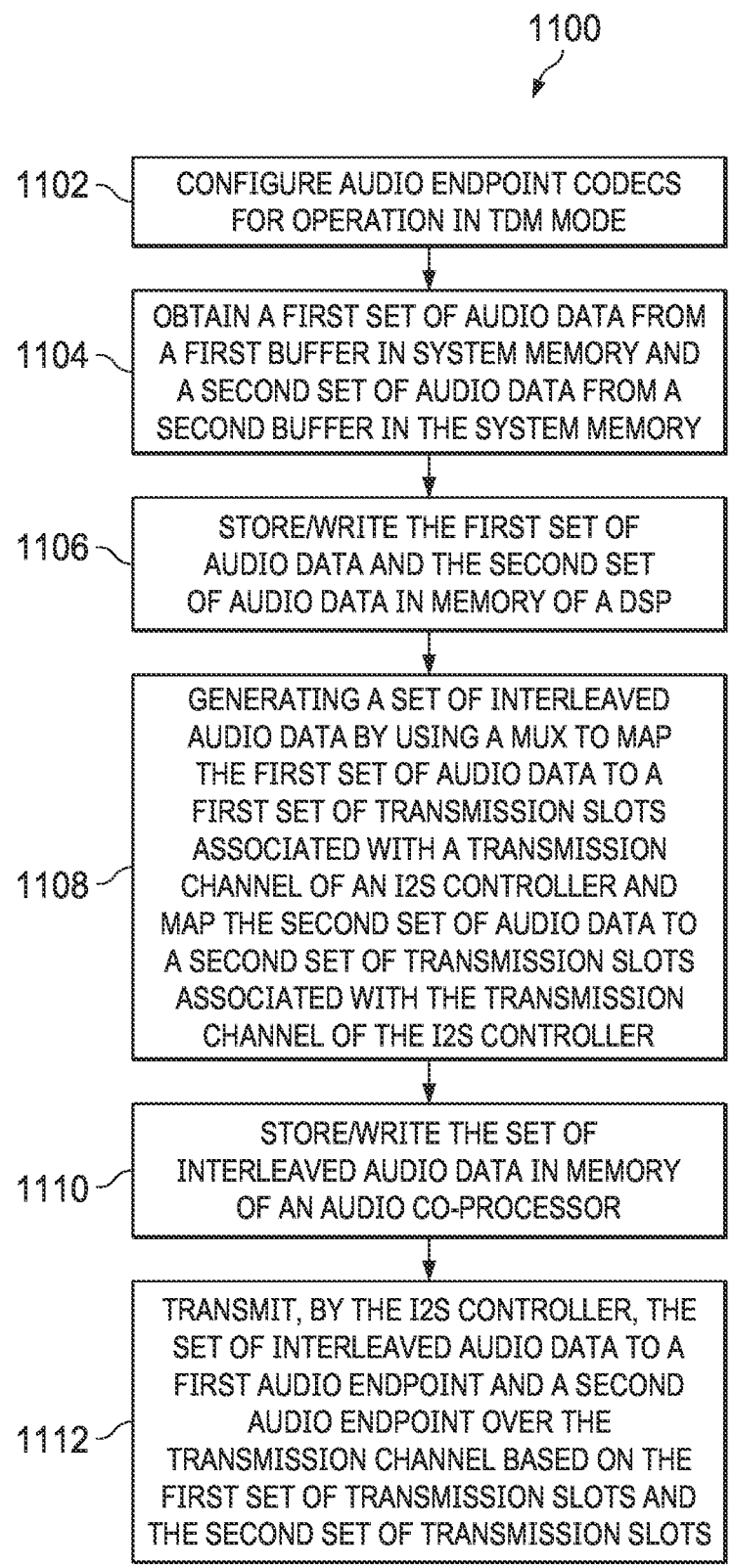
FIG. 11 is a flow diagram illustrating an overview of another example method for supporting simultaneous playback of audio data at different audio endpoints using a single controller in accordance with some implementations.

FIG. 11 is a flow diagram illustrating an overview of another example method 1100 for supporting simultaneous playback of audio data 502 at different audio endpoints 332 using a single I2S controller 320. It should be understood the processes described below with respect to method 1100 have been described above in greater detail with reference to FIG. 5 to FIG. 8. Also, one or more blocks may be omitted from or added to the method 1100 shown in FIG. 11. At block 1102, the computing system 300 configures the audio endpoint CODECs 312 supported by the single I2S controller 320 to operation in TDM mode as described above. At block 1104, the computing system 300 obtains a first set of audio data 502-1 from a first buffer 504-1 in the system memory 308 and obtains a second set of audio data 502-2 from a second buffer 504-2 in the system memory 308.

At block 1106, the DSP 318 of the audio co-processor 310 stores/writes the first set of audio data 502-1 and the second set of audio data 502-2 in memory 324 of the DSP 318. At block 1108, the DSP 318 generates a set of interleaved audio data by using a MUX 326 to map the first set of audio data 502-1 to a first set of transmission slots associated with a transmission channel of the I2S controller 320 and map the second det of audio data 502-2 to a second set of transmission slots associated with the transmission channel. At block 1110, the DSP 318 stores/writes the set of interleaved audio data in a buffer/memory 330 of the audio co-processor 310. At block 1112, the I2S controller 320 transmits the set of interleaved audio data 502 to the first audio endpoint_1 332-1 and the second audio endpoint_N 332-2 over the transmission channel based on the first and second sets of transmission slots.

Figure 12:
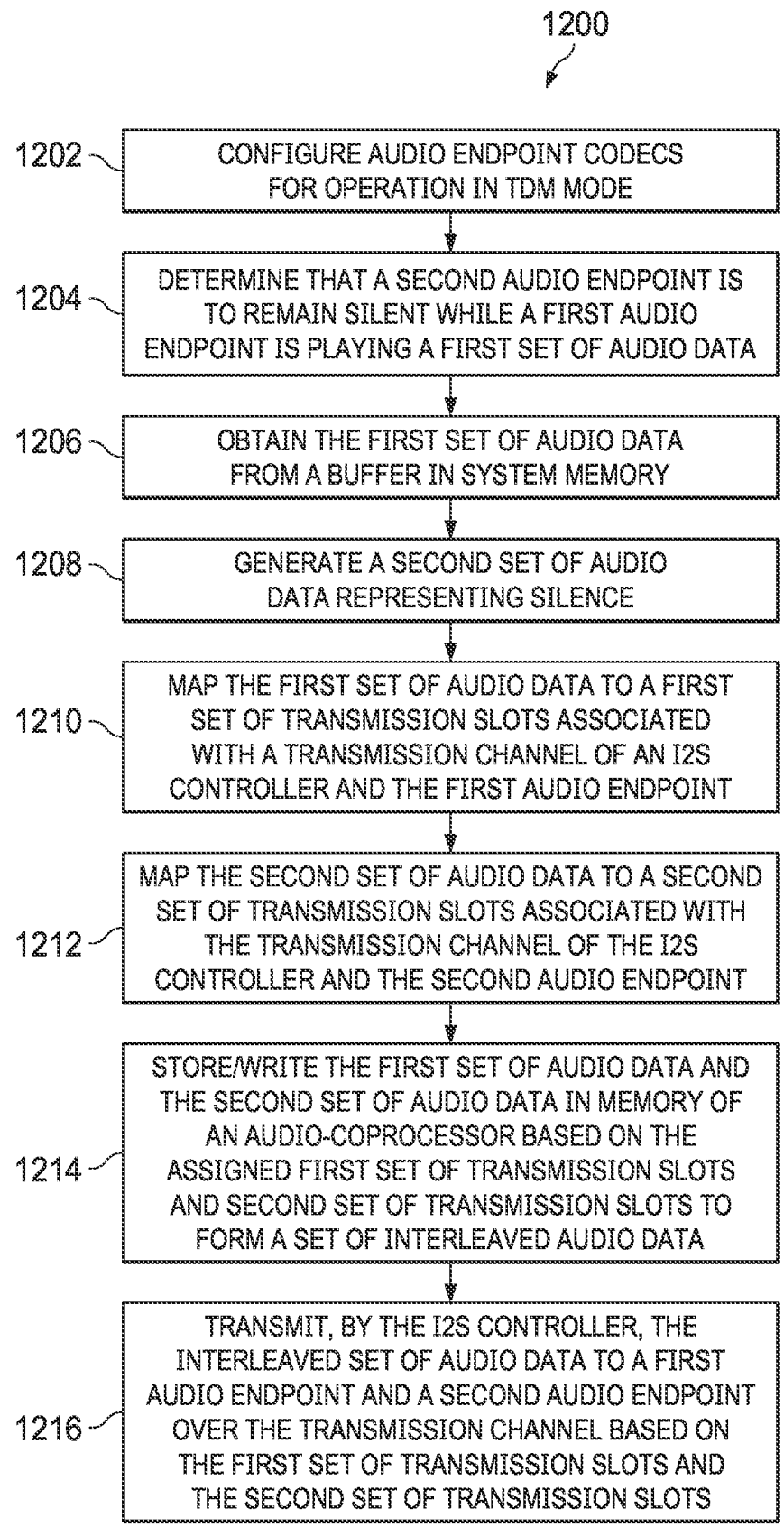
FIG. 12 is a flow diagram illustrating an overview of an example method for supporting multiple audio endpoints using a single I2S controller in accordance with some implementations.

FIG. 12 is a flow diagram illustrating an overview of an example method 1200 for supporting multiple audio endpoints 332 using a single I2S controller 320. It should be understood the processes described below with respect to method 1200 have been described above in greater detail with reference to FIG. 5 to FIG. 8. Also, one or more blocks may be omitted from or added to the method 1200 shown in FIG. 12. At block 1202, the computing system 300 configures the audio endpoint CODECs 312 supported by the single I2S controller 320 to operation in TDM mode as described above. At block 1204, the computing system 300 determines that a second audio endpoint_N 332-2 is to remain silent while a first audio endpoint_1 332-1 is playing a first set of audio data 502.

At block 1206, the computing system 300 obtains the first set of audio data 502-1 from a buffer 504 in the system memory 308. At block 1208, the computing system 300 generates a second set of audio data 602 representing silence. At block 1210, the computing system 300 maps the first set of audio data 502-1 to a first set of transmission slots associated with the transmission channel of the I2S controller 320. At block 1212, The computing system 300 maps the second set of audio data 502-2 to a second set of transmission slots associated with the transmission channel of the I2S controller 320. At block 1214, the computing system 300 stores/writes the first set of audio data 502-1 and the second set of audio data 502-2 in a buffer/memory 330 of an audio co-processor 310 based on the assigned first set of transmission slots and the second set of transmission slots to form a set of interleaved audio data 502. At block 1216, the I2S controller 320 of the computing system 300 transmits the set of interleaved audio data 502 to the first audio endpoint_1 332-1 and the second audio endpoint_N 332-2 over the transmission channel based on the first and second sets of transmission slots. It should be understood that if the DSP 318 is performing the method 1200, additional operations are performed after block 1206 or block 1208 to store the first set of audio data 502-1 and optionally the second set of audio data 602 in memory 324 of the DSP 318.

In some implementations, the apparatus and techniques described above are implemented in a system including one or more integrated circuit (IC) devices (also referred to as integrated circuit packages or microchips). Electronic design automation (EDA) and computer-aided design (CAD) software tools, in at least some implementations, are used in the design of the standard cells and the design and fabrication of IC devices implementing the standard cells. These design tools typically are represented as one or more software programs. The one or more software programs include code executable by a computer system to manipulate the computer system to operate on code representative of circuitry of one or more IC devices to perform at least a portion of a process to design or adapt a manufacturing system to fabricate the circuitry. This code, in at least some implementations, includes instructions, data, or a combination of instructions and data. The software instructions representing a design tool or fabrication tool typically are stored in a computer-readable storage medium accessible to the computing system. Likewise, the code representative of one or more phases of the design or fabrication of an IC device, in at least some implementations, is stored in and accessed from the same computer-readable storage medium or a different computer-readable storage medium.

A computer-readable storage medium, in at least some implementations, includes any non-transitory storage medium or combination of non-transitory storage media accessible by a computer system during use to provide instructions and or data to the computer system. Such storage media, in at least some implementations, includes, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium, in at least some implementations, is embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some implementations, certain aspects of the techniques described above are implemented by one or more processors of a processing system executing software. The software includes one or more sets of executable instructions stored or otherwise tangibly embodied on a non-transitory computer-readable storage medium. The software, in at least some implementations, includes the instructions and certain data that, when executed by the one or more processors, manipulate the one or more processors to perform one or more aspects of the techniques described above. The non-transitory computer-readable storage medium, in at least some implementations, includes, for example, a magnetic or optical disk storage device, solid-state storage devices such as Flash memory, a cache, random access memory (RAM), or other non-volatile memory device or devices, and the like. The executable instructions stored on the non-transitory computer-readable storage medium, in at least some implementations, is in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified, and all such variations are considered within the scope of the disclosed subject matter. Accordingly, the protection sought herein is as set forth in the claims below.

What is claimed is:

1. A method comprising:
    mapping a first set of audio data to a first set of transmission slots associated with a single transmission channel, and mapping a second set of audio data that is different from the first set of audio data to a second set of transmission slots associated with the single transmission channel; and
    transmitting the first set of audio data during the first set of transmission slots to a first audio endpoint, and the second set of audio data during the second set of transmission slots to a second audio endpoint.

2. The method of claim 1, wherein the single transmission channel is a transmission channel of an Integrated Inter-chip Sound (I2S) controller.

3. The method of claim 2, further comprising assigning a virtual instance of the I2S controller to the second audio endpoint.

4. The method of claim 1, wherein mapping the first set of audio data comprises:
    mapping audio data associated with a first audio channel to a first transmission slot of the first set of transmission slots; and
    mapping audio data associated with a second audio channel to a second transmission slot of the first set of transmission slots.

5. The method of claim 1, wherein mapping the second set of audio data comprises:
    mapping audio data associated with a first audio channel to a first transmission slot of the second set of transmission slots; and
    mapping audio data associated with a second audio channel to a second transmission slot of the second set of transmission slots.

6. The method of claim 1, wherein mapping the first set of audio data and the second set of audio data comprises:
    obtaining the first set of audio data from a first buffer in system memory and obtaining the second set of audio data from a second buffer in the system memory;
    interleaving the first set of audio data and the second set of audio data based on the first set of transmission slots and the second set of transmission slots to generate an interleaved set of audio data; and
    writing the interleaved set of audio data to memory of an audio co-processor.

7. The method of claim 1, wherein mapping the first set of audio data and the second set of audio data comprises:
    obtaining the first set of audio data from a first buffer in system memory and the second set of audio data from a second buffer in the system memory;
    responsive to obtaining the first set of audio data and the second set of audio data, writing the first set of audio data and the second set of audio data to memory of a digital signal processor (DSP) of an audio co-processor;
    responsive to writing the first set of audio data and the second set of audio data to the memory of the DSP, interleaving the first set of audio data and the second set of audio data based on the first set of transmission slots and the second set of transmission slots to generate an interleaved set of audio data; and
    writing the interleaved set of audio data to memory of the audio co-processor.

8. The method of claim 1, further comprising:
    responsive to determining that the second audio endpoint is to remain silent during playback of the first set of audio data by the first audio endpoint, generating the second set of audio data, wherein the second set of audio data represents silence.

9. The method of claim 1, wherein transmitting the first set of audio data and the second set of audio data comprises:
    transmitting the first set of audio data to a first coder/decoder (CODEC) associated with the first audio endpoint and assigned to the first set of transmission slots; and
    transmitting the second set of audio data to a second CODEC associated with the second audio endpoint and assigned to the second set of transmission slots.

10. The method of claim 1, wherein the first set of transmission slots and the second set of transmission slots each comprise sequential transmission slots.

11. The method of claim 1, wherein the first set of transmission slots and the second set of transmission slots each comprise non-sequential transmission slots.

12. A method comprising:
    assigning a first coder/decoder (CODEC) associated with a first audio endpoint to a first set of transmission slots of a transmission channel of an Integrated Inter-chip Sound (I2S) controller;
    assigning a second CODEC associated with a second audio endpoint to a second set of transmission slots of the transmission channel of the Integrated Inter-chip Sound (I2S) controller; and
    transmitting a first set of audio data during the first set of transmission slots to the first CODEC, and transmitting a second set of audio data that is different from the first set of audio data during the second set of transmission slots to the second CODEC.

13. The method of claim 12, further comprising:
    mapping the first set of audio data to the first set of transmission slots, and mapping the second set of audio data to the second set of transmission slots.

14. The method of claim 13, wherein mapping the first set of audio data and the second set of audio data comprises:
    obtaining the first set of audio data from a first buffer in system memory and obtaining the second set of audio data from a second buffer in the system memory;
    interleaving the first set of audio data and the second set of audio data based on the first set of transmission slots and the second set of transmission slots to generate an interleaved set of audio data; and writing the interleaved set of audio data to memory of an audio co-processor.

15. The method of claim 13, wherein mapping the first set of audio data and the second set of audio data comprises:

obtaining the first set of audio data from a first buffer in system memory and the second set of audio data from a second buffer in the system memory;

responsive to obtaining the first set of audio data and the second set of audio data, writing the first set of audio data and the second set of audio data to memory of a digital signal processor (DSP) of an audio co-processor;

responsive to writing the first set of audio data and the second set of audio data to the memory of the DSP, interleaving the first set of audio data and the second set of audio data based on the first set of transmission slots and the second set of transmission slots to generate an interleaved set of audio data; and writing the interleaved set of audio data to memory of the audio co-processor.

16. A computing system comprising:

an audio co-processor configured to:

map a first set of audio data to a first set of transmission slots associated with a single transmission channel, and a second set of audio data that is different from the first set of audio data to a second set of transmission slots associated with the single transmission channel; and transmit the first set of audio data during the first set of transmission slots to a first audio endpoint of the computing system, and the second set of audio data during the second set of transmission slots to a second audio endpoint of the computing system.

17. The computing system of claim 16, wherein the audio co-processor comprises a single Integrated Inter-chip Sound (I2S) controller, wherein the I2S is configured to transmit the first set of audio data during the first set of transmission slots to the first audio endpoint, and the second set of audio data during the second set of transmission slots to the second audio endpoint.

18. The computing system of claim 16, wherein the audio co-processor is configured to map the first set of audio data and the second set of audio data by:

obtaining the first set of audio data from a first buffer in memory of the computing system and the second set of audio data from a second buffer in the memory;

interleaving the first set of audio data and the second set of audio data based on the first set of transmission slots and the second set of transmission slots to generate an interleaved set of audio data; and writing the interleaved set of audio data to memory of the audio co-processor.

19. The computing system of claim 16, wherein the audio co-processor comprises a digital signal processor (DSP) and is configured to map the first set of audio data and the second set of audio data by:

obtaining the first set of audio data from a first buffer memory of the computing system and the second set of audio data from a second buffer in the memory;

responsive to obtaining the first set of audio data and the second set of audio data, writing the first set of audio data and the second set of audio data to memory of the DSP;

responsive to writing the first set of audio data and the second set of audio data to the memory of the DSP, interleaving the first set of audio data and the second set of audio data based on the first set of transmission slots and the second set of transmission slots to generate an interleaved set of audio data;

and writing the interleaved set of audio data to memory of the audio co-processor.

20. The computing system of claim 16, wherein the audio co-processor is further configured to:

responsive to a determination that the second audio endpoint is to remain silent during playback of the first set of audio data by the first audio endpoint, generate the second set of audio data, wherein the second set of audio data represents silence.

* * * * *